United States Patent
Valkonen et al.

(10) Patent No.: US 10,017,636 B2
(45) Date of Patent: Jul. 10, 2018

(54) USE OF LOW MOLECULAR WEIGHT LIGNIN TOGETHER WITH LIGNIN FOR THE PRODUCTION OF A PHENOL-FORMALDEHYDE BINDER COMPOSITION

(71) Applicant: UPM-Kymmene Corporation, Helsinki (FI)

(72) Inventors: Sanna Valkonen, Lappeenranta (FI); Suvi Pietarinen, Lappeenranta (FI); Okko Ringena, Neusass (DE); Kati Oinonen, Imatra (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 15/257,439

(22) Filed: Sep. 6, 2016

(65) Prior Publication Data
US 2016/0376434 A1 Dec. 29, 2016

Related U.S. Application Data

(62) Division of application No. 14/388,880, filed as application No. PCT/FI2013/050352 on Mar. 28, 2013.

(30) Foreign Application Priority Data

Mar. 29, 2012 (FI) .................................. 20125357

(51) Int. Cl.
*C08L 61/06* (2006.01)
*C08H 7/00* (2011.01)
(Continued)

(52) U.S. Cl.
CPC ............... *C08L 61/06* (2013.01); *B27D 1/04* (2013.01); *C08G 8/20* (2013.01); *C08G 8/24* (2013.01);
(Continued)

(58) Field of Classification Search
CPC ........ C08L 97/005; C08L 97/00; C08L 61/06; C08L 61/04; C09J 197/005
See application file for complete search history.

(56) References Cited

U.S. PATENT DOCUMENTS

| | | | | |
|---|---|---|---|---|
| 4,105,606 A | * | 8/1978 | Forss ...................... | C08L 97/02 156/335 |
| 4,292,216 A | * | 9/1981 | Grunewald .............. | C08H 6/00 524/594 |

(Continued)

FOREIGN PATENT DOCUMENTS

| CN | 101104782 A | 1/2008 |
|---|---|---|
| DE | 31 23 999 A1 | 1/1983 |

(Continued)

OTHER PUBLICATIONS

Aimar, et al., "Calibration of ultrafiltration membranes against size exclusion chromatography columns," Journal of Membrane Science 346 (2010) 233-239.

(Continued)

*Primary Examiner* — Michael A Salvitti
(74) *Attorney, Agent, or Firm* — Nixon Peabody LLP

(57) ABSTRACT

The present invention relates to a method for producing a binder composition, wherein the method comprises the following steps: (i) forming an aqueous composition comprising reactant components including lignin molecules of 11-60 lignin units, lignin molecules of 1-10 lignin units, polymerizable substance and crosslinking agent in the presence of a catalyst; and (ii) cooking the composition at a temperature of 60-95° C. for polymerizing the reactant components until a binder composition with a predetermined viscosity value is formed.

18 Claims, 2 Drawing Sheets

(51) Int. Cl.
| | |
|---|---|
| C08G 8/20 | (2006.01) |
| C09J 161/12 | (2006.01) |
| C09J 197/00 | (2006.01) |
| C08L 97/00 | (2006.01) |
| C08L 97/02 | (2006.01) |
| C08G 8/24 | (2006.01) |
| C09J 5/00 | (2006.01) |
| C09J 161/06 | (2006.01) |
| B27D 1/04 | (2006.01) |

(52) U.S. Cl.
CPC ............ *C08H 6/00* (2013.01); *C08L 97/005* (2013.01); *C08L 97/02* (2013.01); *C09J 5/00* (2013.01); *C09J 161/06* (2013.01); *C09J 161/12* (2013.01); *C09J 197/005* (2013.01); *C08L 2201/54* (2013.01); *C09J 2461/00* (2013.01); *C09J 2497/00* (2013.01)

(56) References Cited

U.S. PATENT DOCUMENTS

| | | | | |
|---|---|---|---|---|
| 5,110,414 | A * | 5/1992 | Forss | C08L 97/02 162/11 |
| 5,866,642 | A * | 2/1999 | McVay | C08H 6/00 524/13 |
| 6,632,931 | B1 * | 10/2003 | Funaoka | C08H 6/00 530/502 |
| 7,402,224 | B1 * | 7/2008 | Avignon | D21O 5/00 162/19 |
| 9,469,795 | B2 * | 10/2016 | Valkonen | C08H 6/00 |
| 2010/0166968 | A1 * | 7/2010 | Doherty | D21H 17/23 427/387 |
| 2012/0322990 | A1 * | 12/2012 | Passauer | C08H 6/00 530/502 |
| 2014/0030540 | A1 * | 1/2014 | Valkonen | C08L 61/06 428/535 |
| 2015/0068112 | A1 * | 3/2015 | Varvemaa | C07G 1/00 44/578 |
| 2015/0087781 | A1 * | 3/2015 | Valkonen | C08H 6/00 524/735 |
| 2015/0203522 | A1 * | 7/2015 | Valkonen | C07G 1/00 530/500 |
| 2016/0376434 | A1 * | 12/2016 | Valkonen | C08H 6/00 524/735 |

FOREIGN PATENT DOCUMENTS

| | | |
|---|---|---|
| WO | WO 92/18557 A1 | 10/1992 |
| WO | WO 93/21260 A2 | 10/1993 |

OTHER PUBLICATIONS

Chen, C., "Gluability of Kraft Lignin Copolymer Resins on Bonding Southern Pine Plywood", Holzforschung, vol. 49, 1995, pp. 153-157.
Chinese Office Action for corresponding Chinese Patent Application No. 201380018154.7 dated Apr. 28, 2016, English translation, 8 pages.
Opposition filed against Finnish Patent 123934 (Application No. 20125357) on Oct. 16, 2014.
Danielson, B. et al., "Kraft lignin in phenol formaldehyde resin. Part 1. Partial replacement of phenol by kraft lignin in phenol formaldehyde adhesives for plywood", Journal of Adhesion Science and Technology, vol. 12, No. 9, 1998, pp. 923-939.
English translation of the Response filed by Opponent in Opposition to Finnish Patent 123934 (Application No. 20125357) dated Aug. 26, 2015.
Finnish Search Report for corresponding Finnish Patent Application No. 20125357 dated Feb. 20, 2013.
Gellerstedt et al., "Structural and molecular properties of birch kraft residual lignin," J. Wood Chem. Technol. 14(4):467-482 (1994) (Part 4. Phenolic hydroxyl groups in wood and kraft pulps).
H. Panda, "The Complete Technology Book on Natural Products (Forest Based)," A thesis presented for the degree of Masters of Science in Chemistry in the University of Canterbury, Christchurch, New Zeeland, University of Canterbury, 1976, published by Asia Pacific Business Inc., p. 511.
Hu, L. et al., "Methods to Improve Lignin's Reactivity as a Phenol Substitute and as Replacement for Other Phenolic Compounds: A Brief Review", *BioResources*, 6(3): 3515-3525 (2011).
Huijgen, W. et al., "Lignin Production by Organosolv Fractionation of Lignocellulosic Biomass", *International Biomass Valorisation Congress*, Amsterdam, 22 pages, (2010).
International Preliminary Report on Patentability for corresponding International Patent Application No. PCT/FI2013/050352 dated May 9, 2014.
International Search Report for corresponding International Patent Application No. PCT/FI2013/050352 dated Jul. 2, 2013.
Jacobs et al., "Absolute molar mass of lignins by size exclusion chromatography and MALDI-TOF mass spectroscopy", *Nordic Pulp and Paper Research Journal*, 15(2): 120-127, 2000.
Jönsson, A.S. et al., "Concentration and purification of lignin in hardwood kraft pulping liquor by ultrafiltration and nanofiltration", *Chemical Engineering Research and Design*, 86: 1271-1280 (2008).
Lin, S. ed. et al., "Methods in Lignin Chemistry", *Springer Verlag Berlin*, 2 pages, (1992).
Mansouri, H. et al., "Synthetic-resin-free wood panel adhesives from mixed low molecular mass lignin and tannin", Eur. J. Wood Prod., vol. 69, No. 2, 2011, pp. 221-229.
Response filed by Opponent in Opposition to Finnish Patent 123934 (Application No. 20125357) dated Aug. 26, 2015.
Sarkanen, K.V.; H.M. Chang and B. Ericsson (1967), "Species variation in lignins infrared spectra of guaiacyl and syringyl models," Tappi. 50: 572-575.1.
Vishtal, A. et al., "Challenges in Industrial Applications of Technical Lignins", *BioResources*, 6(3): 3547-3568 (2011).
H. Panda, The Complete Technology Book on Natural Products (Forest Based).
Oxidative polymerization of Calcium Ligninsulphonate—A Thesis Presented for the Degree of Masters of Science in Chemistry in the University of Canterbury, Christchurch, New Zeeland, University of Canterbury, 1976.
Gellerstedt, G., Pranda, J., Lindfors, E.-L., "Structural and Molecular Properties of Birch Kraft Residual Lignin", J. Wood Chem. Technol. 14(4):467-482 (1994).
Sarkanen, K.V.; H.M. Chang and B. Ericsson (1967), Species Variation in Lignins Infrared Spectra of Guaiacyl and Syringyl Models, Tappi. 50: 572-575.I.
Aimar, P., and Meireles, M. (Calibration of ultrafiltration membranes against size exclusion chromatography columns, Journal of Membrane Science 346 (2010) 233-239).
Göran Gellerstedt, et al., "Structural Changes in Lignin During Kraft Cooking", Part 4 Phenolic hydroxyl groups in wood and kraft pulps.

* cited by examiner

USE OF LOW MOLECULAR WEIGHT LIGNIN TOGETHER WITH LIGNIN FOR THE PRODUCTION OF A PHENOL-FORMALDEHYDE BINDER COMPOSITION

This application is a Divisional Application of U.S. patent application Ser. No. 14/388,880, filed 29 Sep. 2014, which is a National Stage Application of PCT/FI2013/050352, filed 28 Mar. 2013, which claims benefit of Serial No. 20125357, filed 29 Mar. 2012 in Finland and which applications are incorporated herein by reference. To the extent appropriate, a claim of priority is made to each of the above disclosed applications.

FIELD OF THE INVENTION

The invention relates to a method for producing a binder composition, to a binder composition and to different applications of the binder composition.

BACKGROUND OF THE INVENTION

Lignin is a natural polymer, which can be extracted from e.g wood. As lignin is a natural biopolymer its use as a component in glues instead of synthetic materials has been investigated in order to come up with a more environmentally friendly adhesive composition. Especially, the ability to replace synthetic phenol in phenolic resins, such as phenol formaldehyde resin, has been the object of prior art.

Different types of adhesive compositions, such a phenolic glues, can be used with wood products. Examples of such glues include compositions comprising phenol formaldehyde resin. Traditionally synthetic phenol formaldehyde resins are produced by polymerizing phenol and formaldehyde in the presence of a catalyst. Examples of such catalysts are sodium hydroxide (NaOH) and acids. The method for producing phenol formaldehyde resin comprises adding formaldehyde in a stepwise manner to a phenol composition and thereafter increasing the temperature of the formed composition up to 80-90° C. The composition is cooked at this temperature until a desired viscosity of the formed resin or polymer chain length is reached.

Lignin can be used for the purpose of decreasing the amount of synthetic phenol in a resin composition. Lignin has previously been used for replacing phenol during the production of lignin-phenolformaldehyde resin.

It has been possible to replace up to 30% of the synthetic phenol in the final resin, e.g. phenol formaldehyde resin, with lignin but higher replacement has resulted in unsatisfying properties of the produced glue.

The inventors have therefore recognized a need for a method, which would result in a higher phenol replacement in the composition and thus in a more environmentally friendly binder composition having suitable properties for use in different applications.

PURPOSE OF THE INVENTION

The purpose of the invention is to provide a new type of method for replacing at least part of the amount of synthetic materials used during the production of a binder composition. Especially the purpose is to produce a more environmentally friendly binder composition to be used e.g. in adhesive applications.

SUMMARY

The method according to the present invention is characterized by what is presented in claim 1.

The binder composition according to the present invention is characterized by what is presented in claim 16.

The adhesive composition according to the present invention is characterized by what is presented in claim 17.

The uses according to the present invention are characterized by what is presented in claims 18 and 19.

BRIEF DESCRIPTION OF THE DRAWINGS

The accompanying drawings, which are included to provide a further understanding of the invention and constitutes a part of this specification, illustrate some embodiments of the invention and together with the description helps to explain the principles of the invention. In the drawings.

DETAILED DESCRIPTION OF THE INVENTION

Figure 1:
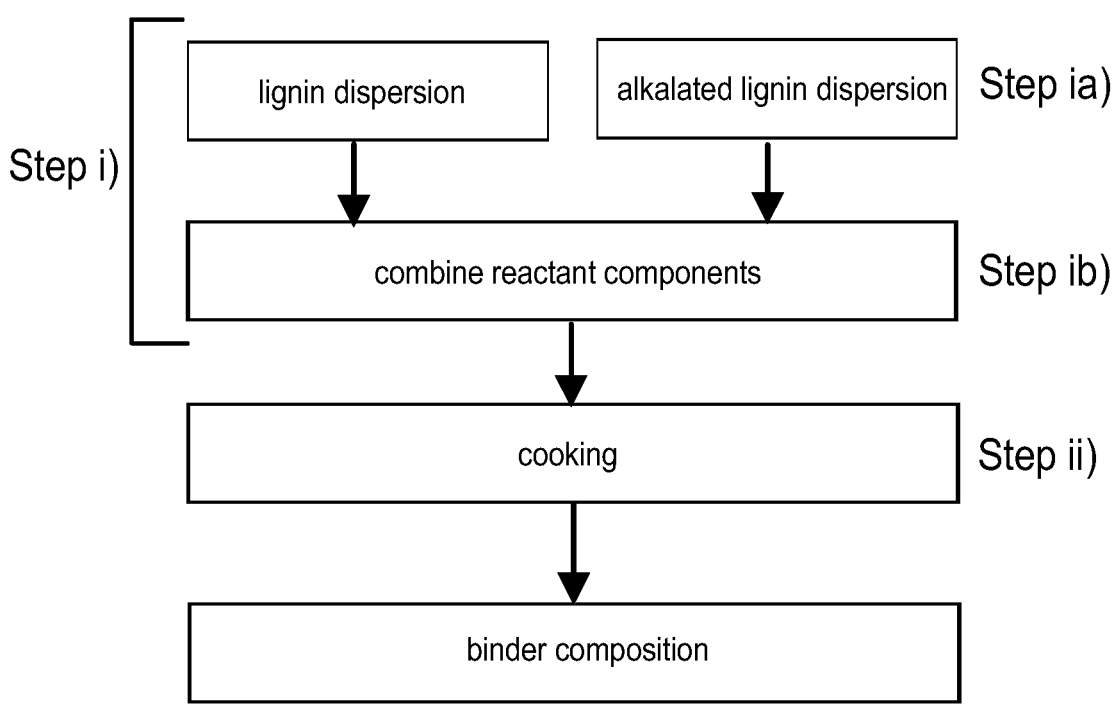
FIG. 1 is a flow chart illustration of a method according to one embodiment of the present invention.

The present invention relates to a method for producing a binder composition, wherein the method comprises the following steps:

(i) forming an aqueous composition comprising reactant components including lignin molecules of 11-lignin units, lignin molecules of 1-10 lignin units, polymerizable substance and crosslinking agent in the presence of a catalyst; and (ii) cooking the composition at a temperature of 45-95° C. for polymerizing the reactant components until a binder composition with a predetermined viscosity value is formed.

The expression "lignin molecules of 11-60 lignin units" should be understood in this specification, unless otherwise stated, as referring to high molecular weight lignin. The expression "lignin molecules of 1-10 lignin units" should be understood in this specification, unless otherwise stated as referring to low molecular weight lignin.

The present invention relates to a method for producing a binder composition, wherein the method comprises the following steps:

(i) forming an aqueous composition comprising reactant components including high molecular weight lignin, low molecular weight lignin, polymerizable substance and crosslinking agent in the presence of a catalyst; and (ii) cooking the composition at a temperature of 45-95° C. for polymerizing the reactant components until a binder composition with a predetermined viscosity value is formed;

wherein the high molecular weight lignin comprises lignin molecules of 11-60 lignin units, and wherein the low molecular weight lignin comprises lignin molecules of 1-10 lignin units.

The expression "high molecular weight lignin" should be understood in this specification, unless otherwise stated, as comprising lignin molecules of 11-60 lignin units.

The expression "low molecular weight lignin" should be understood in this specification, unless otherwise stated, as comprising lignin molecules of 1-10 lignin units.

The expression "lignin unit" should be understood in this specification, unless otherwise stated, as phenylpropane. The phenylpropane can comprise OH- and/or OMe-groups attached thereto. The lignin units are crosslinked to each other through ether linkages. One phenylpropane comprises nine carbon atoms.

A drawback of different methods for separating or isolating lignin from e.g. biomass is that the lignin is condensed during the procedure due to the low pH environment used. Thus, separated lignin has a rather low reactivity and a heterogenic nature, which affect the reactions with other reactant components during the production of a binder composition. The low reactivity of lignin has been one of the reasons preventing a higher replacement level of e.g. synthetic phenol in binder compositions with biobased lignin. It has been recognized that the properties of currently available binder compositions, wherein up to 50-60% of the synthetic phenol has been replaced with lignin, are not acceptable for e.g. gluing applications. E.g. the strength of glued joints has not been on a required level.

The inventors surprisingly found out that by using low molecular weight lignin in combination with a fraction of high molecular weight lignin during the production of a binder composition a higher replacement level of e.g. synthetic phenol in binder compositions can be achieved. It was found out that the use of low molecular weight lignin, which is recognized as more reactive compared to high molecular weight lignin, e.g. boosts the reactions taking place during the binder composition production.

In one embodiment of the present invention the high molecular weight lignin is separated from black liquor, kraft lignin, biomass originating lignin, lignin from alkaline pulping process, lignin from soda process, lignin from organosolv pulping or from a combination thereof. In one embodiment of the present invention the low molecular weight lignin is separated from black liquor, kraft lignin, biomass originating lignin, lignin from alkaline pulping process, lignin from soda process, lignin from organosolv pulping or from a combination thereof.

Low molecular weight lignin as well as high molecular weight lignin can be separated from different sources using different kinds of methods or procedures. Low molecular weight lignin can be separated from e.g. kraft lignin by ultrafiltration, nanofiltration or by sequential precipitation. Low molecular lignin can also be separated from black liquor by e.g. ultrafiltration.

In this specification, unless otherwise stated, the expression "lignin" should be understood as any lignin suitable to be used in the present invention.

Lignin may include essentially pure lignin as well as lignin derivatives and lignin modifications.

By the expression "essentially pure lignin" should be understood as at least 90% pure lignin, preferably at least 95% pure lignin. In one embodiment of the present invention the essentially pure lignin comprises at most 10%, preferably at most 5%, of other components. Extractives and carbohydrates such as hemicelluloses can be mentioned as examples of such other components.

By "kraft lignin" is to be understood in this specification, unless otherwise stated, lignin that originates from kraft black liquor. Black liquor is an alkaline aqueous solution of lignin residues, hemicellulose, and inorganic chemicals used in a kraft pulping process. The black liquor from the pulping process comprises components originating from different softwood and hardwood species in various proportions. Lignin can be separated from the black liquor by different, techniques including e.g. precipitation and filtration. Lignin usually begins precipitating at pH values below 11-12. Different pH values can be used in order to precipitate lignin fractions with different properties. These lignin fractions differ from each other by molecular weight distribution, e.g. Mw and Mn, polydispersity, hemicellulose and extractive contents. The molar mass of lignin precipitated at a higher pH value is higher than the molar mass of lignin precipitated at a lower pH value. Further, the molecular weight distribution of lignin fraction precipitated at a lower pH value is wider than of lignin fraction precipitated at a higher pH value. Thus the properties of the lignin can be varied depending on the end use of the gluing application.

The precipitated lignin can be purified from inorganic impurities, hemicellulose and wood extractines using acidic washing steps. Further purification can be achieved by filtration.

In one embodiment of the present invention the dry matter content of the lignin, e.g. the lignin, is below 98%, preferably 40-80%, and more preferably 50-70%.

In one embodiment of the present invention the lignin is separated from pure biomass. The separation process can begin with liquidizing the biomass with strong alkali followed by a neutralization process. After the alkali treatment the lignin can be precipitated in a similar manner as presented above. In one embodiment of the present invention the separation of lignin from biomass comprises a step of enzyme treatment. The enzyme treatment modifies the lignin to be extracted from biomass. Lignin separated from pure biomass is sulphur-free and thus valuable in further processing.

In one embodiment of the present invention the predetermined viscosity value of the final binder composition is at least 40 cP, preferably at least 50 cP, and more preferably at least 80 cP. In one embodiment of the present invention the predetermined viscosity value of the final binder composition is at least 40 but not more than 250 cP, preferably at least 50 cP but not more than 150 cP, and more preferably at least 80 but not more than 120 cP.

In one embodiment of the present invention the predetermined viscosity value of the final binder composition is at least 250 cP, preferably at least 300 cP, and more preferably at least 500 cP. In one embodiment of the present invention the predetermined viscosity value of the final binder composition is at least 250 cP but not more than 1500 cP, preferably at least 300 cP but not more than 1200 cP, and more preferably at least 500 but not more than 1000 cP. The viscosity is measured at 25° C. using a rotary viscometer. The predetermined viscosity value of the final binder composition may vary depending on the specific application where the binder composition is to be used.

In one embodiment of the present invention the high molecular weight lignin is alkalated before being used in the method for producing a binder composition. In one embodiment of the present invention the low molecular weight lignin is alkalated before being used in the method for producing a binder composition. Alkalation of lignin makes the lignin more reactive. In one embodiment the alkalation comprises forming, under heating at a temperature of 30-70° C., an aqueous dispersion comprising alkali and lignin, and heating the formed dispersion at a temperature of 50-95° C. for 15 minutes-2 hours for producing alkalated lignin. The alkali may comprise a hydroxide of an alkali metal. Treating the lignin by alkalation activates the lignin making it more suitable for use in further applications.

In one embodiment of the present invention the weight ratio of lignin molecules of 11-60 lignin units to lignin molecules of 1-10 lignin units is 0.1-20, preferably 0.2-10, and more preferably 0.5-5.

In one embodiment of the present invention step (i) of forming the aqueous composition comprises the following steps:

(ia) forming a dispersion comprising lignin molecules of 11-60 lignin units; and (ib) combining polymerizable substance and crosslinking agent with the dispersion for forming the aqueous composition.

In one embodiment of the present invention step (ib) comprises adding catalyst.

In one embodiment of the present invention step (i) of forming the aqueous composition comprises, after step (ib), the following steps:

(ic) cooking the formed composition until the composition has a viscosity, which corresponds to 15-70% of a predetermined viscosity value of the final binder composition; and (id) adding lignin molecules of 1-10 lignin units as a reactant component to the composition.

In one embodiment of the present invention step (ia) and/or step ib) comprises adding lignin molecules of 1-10 lignin units as a reactant component.

In one embodiment of the present invention step (ia) comprises dissolving lignin in a solvent. In one embodiment of the present invention the solvent comprises sodium hydroxide. In one embodiment of the present invention step (ia) comprises adding water.

The temperature of the dispersion may increase during step (ia) from room temperature up to 70° C.

In one embodiment all of the amount of the polymerizable substance, e.g. phenol, used is added at once into the composition. In one embodiment of the present invention the crosslinking agent, e.g. aldehyde, is added in a stepwise manner. Adding the aldehyde in a stepwise manner ensures that the temperature of the composition is not increased too much or too quickly.

In one embodiment of the present invention step (i) comprises keeping the composition at a temperature of at most 75° C.

In one embodiment of the present invention step (ic) comprises keeping the temperature of the composition between 40-95° C., preferably between 50-85° C., and more preferably between 60-80° C.

In one embodiment of the present invention the temperature of the composition is decreased below 85° C., and preferably below 65° C. before step (id).

In one embodiment of the present invention step (ii) comprises cooking the composition preferably at a temperature of 50-85° C., and more preferably at a temperature of 60-80° C.

In one embodiment of the present invention the temperature of the composition is increased up to 45-95° C., preferably up to 50-85° C., and more preferably up to 60-80° C., before, during or after step (id).

The temperature can be controlled during the production of the binder composition by cooling and/or heating the composition.

In one embodiment of the present invention the weight ratio of lignin molecules of 11-60 lignin units and lignin molecules of 1-10 lignin units to the polymerizable substance is at least 0.2, preferably at least 1, and more preferably at least 5.

In one embodiment of the present invention the amount of lignin molecules of 1-10 lignin units is 1-95%, preferably 3-60%, and more preferably 5-30%, of the amount of lignin molecules of 11-60 lignin units.

In one embodiment of the present invention the relation between the amounts of lignin molecules of 11-60 lignin units, catalyst/solvent, polymerizable substance, crosslinking agent and lignin molecules of 1-10 lignin units, based on their dry contents, used for producing the binder composition is the following: 18-60 weight-%, preferably 26-45 weight-%, of crosslinking agent and catalyst/solvent, and 82-weight-%, preferably 74-55 weight-%, of the polymerizable substance, lignin molecules of 11-60 lignin units and lignin molecules of 1-10 lignin units.

In one embodiment of the present invention the crosslinking agent is selected from a group consisting of an aldehyde, a derivative of an aldehyde, an aldehyde forming compound and combinations thereof. In one embodiment of the present invention the derivative of an aldehyde is hexamethylenetetramine, paraformaldehyde or trioxane. In one embodiment of the present invention the crosslinking agent is selected from a group consisting of an aromatic aldehyde, glyoxal, furfuryl alcohol, caprolactam and glycol compounds. The aldehyde can be formaldehyde. The aromatic aldehyde can be furfuryl aldehyde. In one embodiment of the present invention the crosslinking agent is a bio-based crosslinking agent. In one embodiment of the present invention the crosslinking agent is an aldehyde, and preferably formaldehyde.

In one embodiment of the present invention the polymerizable substance is a compound selected from the class of phenols. In one embodiment of the present invention the polymerizable substance is selected from a group consisting of phenol, cresol, resorcinol and combinations thereof. In one embodiment of the present invention the polymerizable substance is phenol. In one embodiment of the present invention the polymerizable substance is selected from a group consisting of bio-based hydroxyphenols and their derivatives. In one embodiment of the present invention the polymerizable substance is a bio-based polymerizable substance. In one embodiment of the present invention the polymerizable substance is selected from a group consisting of lignin and tannin.

In one embodiment of the present invention step (i) comprises tannin as a reactant component.

In one embodiment of the present invention the tannin used originates from any wood species. Tannin may originate from e.g. bark or heartwood. Quebracho tree, beech tree and wattle tree are presented as examples of possible sources of tannin.

In one embodiment of the present invention the tannin used originates from softwood bark. In one embodiment of the present invention the tannin is separated from softwood bark of debarking units in sawmills or pulp mills. The separation process can be combined with an ethanol extraction process, a hot water extraction process, a hot steam extraction process or a water-ethanol extraction process of softwood bark.

In one embodiment of the present invention the tannin is condensed tannin. Condensed tannin has a high dry content and is therefore suitable to be used in the present invention. The dry matter content of condensed tannin may vary between 40-100% and is suitably between 60-90% and preferably between 70-80%. Tannin with such dry matter content can easily be dispersed, whereby a good reactivity with the other reactant components is achieved. The tannin may also be hydrolysable tannin.

In one embodiment of the present invention the method comprises dispersing tannin before adding it to the composition. If the amount of tannin to be used in the production of the binder composition is more than 3%, preferably more than 5%, more preferably more than 8% of the total dry matter content of the components to be used for the production of the binder composition, then tannin is dispersed before it is added to the composition.

The method of the present invention surprisingly results in a more environmentally friendly binder composition since in the method the natural polymer lignin, which is a phenolic polymer, has replaced at least part of the synthetic phenol substance usually used in the production of phenolic compositions such as phenol formaldehyde resin. Without limiting the invention to any specific theory about why the method of the present invention results in the aforementioned advantage, it is to be considered that the suitability of replacing at least part of e.g. the phenol with lignin is due to the fact that lignin reacts with an aldehyde, such as formaldehyde, in a quite similar manner as phenol. The use of especially low molecular weight lignin as a reactive additive in the method of the present invention boosts the gluing properties of this kind of lignin based phenolic composition.

In one embodiment of the present invention the catalyst comprises a salt or a hydroxide of an alkali metal. In one embodiment of the present invention the catalyst is selected from a group consisting of sodium hydroxide, potassium hydroxide, acids and their combinations. In one embodiment of the present invention the catalyst is sodium hydroxide.

The precise order of combining and/or adding the components needed for the binder composition production may vary depending e.g. on the required properties of the formed binder composition. The choice of the sequence of combining and/or adding the required components is within the knowledge of the skilled person based on this specification. The precise amount of the components used for producing the binder composition may vary and the choice of the amounts of the different components is within the knowledge of the skilled person based on this specification.

When determining the order of mixing and combining together the components to be used in the production of the binder composition, it should be taken into consideration that low molecular weight lignin is more reactive than high molecular weight lignin. Therefore, high molecular weight lignin may preferably be cooked in the aqueous composition for a longer period of time than the low molecular weight lignin. In this way it is ensured that the high molecular weight lignin has sufficiently time to react with the cross-linking agent, e.g. the aldehyde.

The present invention further relates to a binder composition obtainable by the method according to the present invention.

The present invention further relates to an adhesive composition comprising the binder composition according to the present invention. The adhesive composition can further comprise one or more adhesive components selected from a group consisting of other binders, extenders, additives, catalysts and fillers. A binder is a substance, which is mainly responsible for creating the growing and cross-linking of polymer and thus assists in the curing of polymer systems. An extender is a substance, which assists the binder by adjusting physical properties for example by binding moisture. The additive can be a polymer or an inorganic compound, which assists in properties like filling, softening, reducing costs, adjusting moisture, increasing stiffness and increasing flexibility. The catalyst is a substance, which usually boosts and adjusts the curing speed. By "substance" is herein to be understood as including a compound or a composition. The binder composition of the present invention may serve as a binder, an extender, an additive, a catalyst and/or a filler in the adhesive composition.

In one embodiment of the present invention a layered composite structure can be formed of two or more layers including at least one wood veneer layer, wherein the layers are arranged the one above the other and combined by means of gluing with the binder composition according to the present invention and/or the adhesive composition according to the present invention. In this specification, unless otherwise stated, the term "wood veneer" is used to address a veneer, which can be formed of any material, e.g. wood-based material, fiber material, composite material or the like. In this context, the thickness of the wood veneer can be varied. Typically the thickness of wood veneer is below 3 mm.

In one embodiment of the present invention the layered composite structure is selected from a group consisting of a wood panel product, a plywood product, a composite product, and a pressed panel product. The layered composite structure can be formed of a number of layers, preferably wood veneer layers, in which the layers are laid one upon the other and glued together.

The present invention further relates to the use of the binder composition in an impregnation application, as a coating, for strengthening plastic, for producing a compressed casting, a moulding, a laminate or a lacquer, or for gluing a wood product. The binder composition of the present invention can further be used for gluing combinations of plastic and wood.

The present invention further relates to the use of the adhesive composition for gluing a wood product.

In one embodiment of the present invention the wood product is selected from a group consisting of a wood board, a wood veneer, and a wood bar.

The embodiments of the invention described hereinbefore may be used in any combination with each other. Several of the embodiments may be combined together to form a further embodiment of the invention. A method, a composition or a use, to which the invention is related, may comprise at least one of the embodiments of the invention described hereinbefore.

An advantage of the method according to the present invention is that by using both high molecular weight lignin and low molecular weight lignin as reactant components during the production of a binder composition a more environmentally friendly binder composition is achieved. Surprisingly it has been found out that when using both high molecular weight lignin and low molecular weight lignin as reactant components the amount of the polymerizable substance, such as the synthetic phenol substance, e.g. phenol, can be markedly decreased during the binder production process. As the phenol being a synthetic compound and lignin being a natural polymer, it is advantageous to be able to minimize the amount of phenol present in the final binder composition.

An advantage of the method according to the present invention is that by using low molecular weight lignin in the binder production method the compatibility and reaction behavior of the formed binder composition is better than when using high molecular weight lignin only.

An advantage is of the method according to the present invention is that the use of the more reactive low molecular weight lignin in the binder composition enhances e.g. curing and adhesion properties, and the tensile strength performance of the binder composition. I.e. the overall performance of the formed binder composition is advantageous.

Thus, an advantage of the present invention is that a higher level of bio-based components is achieved in the final binder composition. This advantage can be achieved when using the specific process steps of the present invention and especially when low molecular weight lignin is added to the composition.

EXAMPLES

Reference will now be made in detail to the embodiments of the present invention, an example of which is illustrated in the accompanying drawing.

The description below discloses some embodiments of the invention in such a detail that a person skilled in the art is able to utilize the invention based on the disclosure. Not all steps of the embodiments are discussed in detail, as many of the steps will be obvious for the person skilled in the art based on this specification.

FIG. 1 illustrates a method according to one embodiment of the present invention for producing a binder composition.

Before forming an aqueous composition including the reactant components, the source and amounts of the components are chosen in order to prepare a binder composition with desired properties. Especially the amounts and the source of high molecular weight lignin and low molecular weight lignin are selected.

Following various preparations, step (i) and especially step (ia) of said step is carried out by forming a aqueous dispersion comprising lignin. In the embodiment of FIG. 1 both high molecular weight lignin, i.e. lignin molecules of 11-60 lignin units, and low molecular weight lignin, i.e. lignin molecules of 1-10 lignin units, are used in step (ia) for forming a lignin dispersion.

A dispersion in step ia) can be formed e.g. by combining water, sodium hydroxide and the lignin fractions under heating at a temperature of e.g. 25-60° C.

Alternatively, if the lignin is to be alkalated in order to make the lignin even more reactive during the binder cooking step, step (ia) can be performed by firstly mixing water and sodium hydroxide and heating the mixture up to a temperature of about 60° C. Then, high molecular weight lignin can be dispersed into the composition after which low molecular lignin is dispersed. Then the formed dispersion is allowed to cook at a temperature of about 75° C. for about one hour in order to form alkalated lignin. Then, the temperature of the dispersion is decreased to about 50° C. for further use.

Having formed the lignin dispersion in step (ia) the polymerizable substance, the crosslinking agent and the catalyst are added in a predetermined order with simultaneously controlling the temperature of the formed aqueous composition (step (ib)). The selected components can be added one after the other or at least partly simultaneously.

After step (i) of forming the aqueous composition, step (ii) is carried out. Step (ii) comprises cooking the aqueous composition at a temperature of 50-95° C. until a predetermined viscosity of the composition is reached.

As a result of step (ia), step (ib), and step (ii) a binder composition having desired properties is produced. This binder composition can be used as such for gluing applications or it can be further processed with other adhesive components for producing an adhesive composition.

Figure 2:
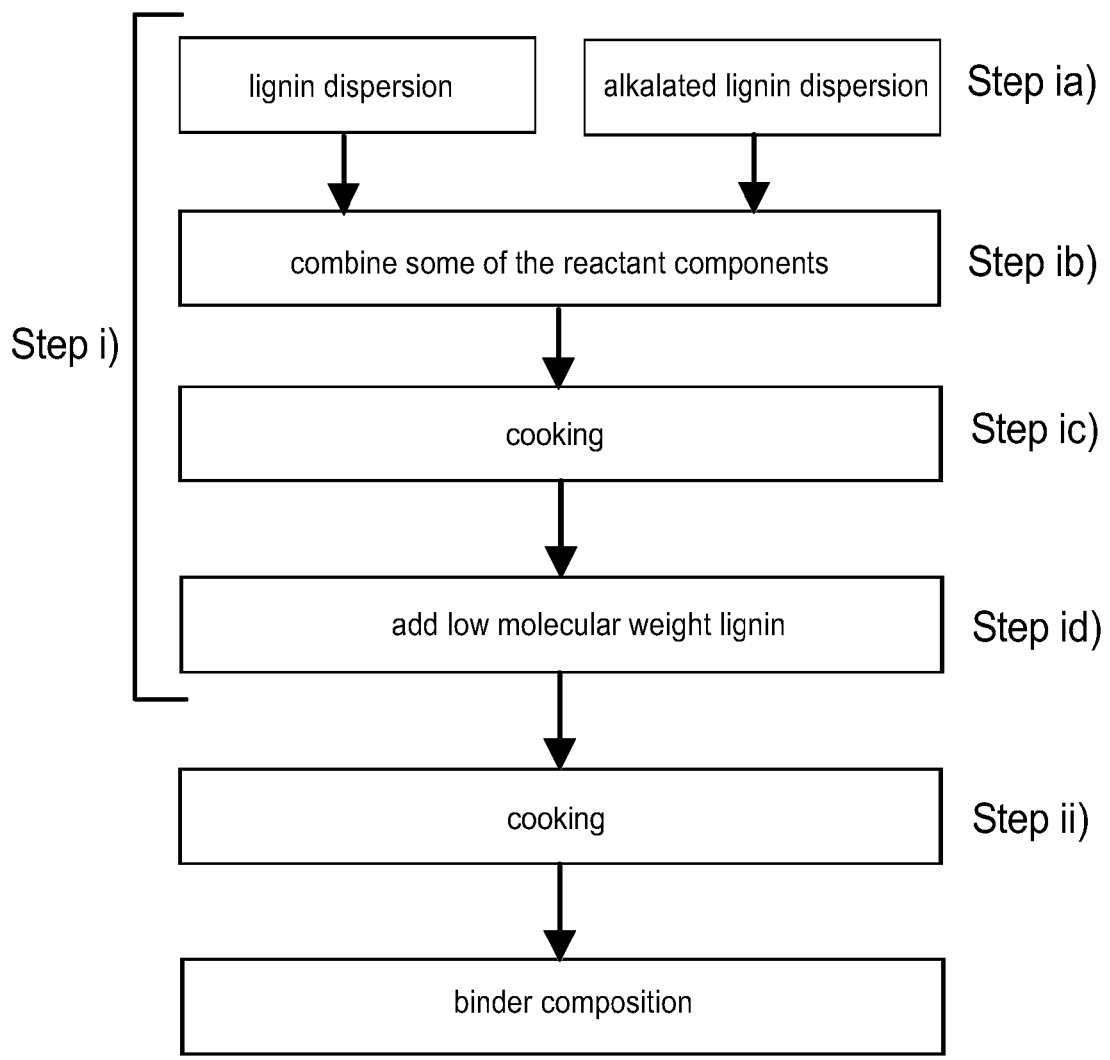
FIG. 2 is a flow chart illustration of a method according to another embodiment of the present invention.

FIG. 2 illustrates a method according to another embodiment of the present invention for producing a binder composition.

The method according to the embodiment of FIG. 2 begins in a similar manner as in the embodiment of FIG. 1. I.e. either an alkalated lignin dispersion or a non-alkalated lignin dispersion is formed as explained above in relation to FIG. 1. However, in the embodiment of FIG. 2 only high molecular weight lignin is used for forming the dispersion in step (ia).

After forming the dispersion in step (ia), step (ib) is carried out. Step (ib) comprises adding the polymerizable substance, the crosslinking agent and the catalyst for forming an aqueous composition. After mixing these components the composition is cooked in step (ic) until the viscosity of the composition is 15-70% of a predetermined viscosity value of the final binder composition. The composition can be cooked at a temperature of 20-95° C.

Then, step (id) of adding low molecular weight lignin to the composition is carried out. The temperature of the formed aqueous composition is increased to 80-90° C. and the composition is cooked at this temperature until a predetermined viscosity of the composition is reached or until a desired polymerizing length is achieved (step (ii) of FIG. 2).

As a result of step (ia), step (ib), step (ic), step (id), and step (ii) a binder composition having desired properties is produced. This binder composition can be used as such for gluing applications or it can be further processed with other adhesive components for producing an adhesive composition.

Example 1—Preparing a Binder Composition

In this example a binder composition was produced. The following components and their amounts were used:

|  | concentration | amount (g) |
|---|---|---|
| water |  | 352 |
| NaOH-I | 50% | 181 |
| HMW-lignin | 98% | 100 |
| LMW-lignin | 98% | 200 |
| phenol | 90% | 327 |
| formaldehyde | 40% | 608 |
| NaOH-II | 50% | 90 |

Firstly, water, the first part of NaOH (NaOH-I) and high molecular weight lignin (HMW-lignin), i.e. lignin having an average molecular weight of 7000 g/mol. were mixed such that a dispersion was formed. Simultaneously the temperature increased from room temperature to about 60° C. Then part of the low molecular weight lignin (LMW-lignin), i.e. lignin having an average molecular weight of 1700 g/mol, was added to the dispersion while keeping the temperature at 25-50° C.

Then all of the phenol was added followed by adding the formaldehyde in a stepwise manner for forming an aqueous composition. The temperature was kept under 75° C. After adding the formaldehyde the composition was allowed to react for 10 minutes after which the rest of the low molecular weight lignin was added. After adding also the second part of the NaOH (NaOH-II) to the composition, the composition was cooked at 85° C. until the viscosity of the formed composition was about 305 cp. Then the composition was cooled and the final viscosity was 315 cP. The viscosity was measured at a temperature of 25° C.

In this example firstly a dispersion of water, NaOH and the lignin was formed after which the addition of phenol was started. However, the dispersion could also have been subjected to an alkalation treatment in order to make the lignin used even more reactive. The alkalation can be performed by firstly mixing water and NaOH, after which heating of the mixture is started. When the temperature has reached 60° C., the high molecular weight lignin is added followed by the low molecular weight lignin. Then the temperature can be reached up 75° C. and the dispersion is allowed to react for about one hour at this temperature for alkalating the lignin. The dispersion is then cooled down to 50° C. before the addition of phenol is begun.

The procedure of example 1 results in the possibility of replacing 50% of the synthetic phenol usually used in the binder production method with lignin.

Example 2—Preparing a Binder Composition

In this example a binder composition was produced. The following components and their amounts were used:

|  | concentration | amount (g) |
| --- | --- | --- |
| water |  | 578 |
| NaOH-I | 50% | 254 |
| HMW-lignin | 61% | 492 |
| LMW-lignin | 90% | 111 |
| phenol | 90% | 443 |
| formaldehyde-I | 40% | 448 |
| formaldehyde-II |  | 493 |
| NaOH-II | 50% | 127 |

Firstly, water and the first part of NaOH (NaOH-I) were mixed and heated up to a temperature of 75° C. Then the HMW-lignin, i.e. lignin having an average molecular weight of 3000 g/mol, was added followed by the addition of LMW-lignin, i.e. lignin having an average molecular weight of 1300 g/mol. When also the LMW-lignin had been added to the dispersion, the dispersion was heated at a temperature of 75° C. for about one hour in order to form alkalated lignin.

After the dispersion had been cooled down to 50° C. the phenol was added followed by adding the first part of the formaldehyde (formaldehyde-I) in a stepwise manner for forming the aqueous composition. Then the temperature was increased up to 75° C., after which also the other part of the formaldehyde (formaldehyde-II) and the second part of the NaOH (NaOH-II) were added. Then the composition was cooked at 85° C. until the viscosity of the formed composition was about 380 cp. Then the composition was cooled and the final viscosity was 430 cP. The viscosity was measured at a temperature of 25° C.

The procedure of example 2 results in the possibility of replacing 50% of the synthetic phenol usually used in the binder production method with lignin.

Example 3—Preparing a Binder Composition

In this example a binder composition was produced. The following components and their amounts were used:

|  | concentration | amount (g) |
| --- | --- | --- |
| water |  | 179 |
| NaOH-I | 50% | 102 |
| HMW-lignin | 97% | 146 |
| LMW-lignin | 97% | 72 |
| phenol | 90% | 123 |
| formaldehyde | 40% | 370 |
| NaOH-II | 50% | 51 |

Firstly, water, the first part of NaOH (NaOH-I) and HMW-lignin, i.e. lignin having an average molecular weight of 8000 g/mol, were mixed under heating such that a dispersion was formed. Then the temperature was adjusted to 50° C., the phenol was added and then the formaldehyde was added in a stepwise manner during a period of one hour. The temperature was kept under 75° C. After the formaldehyde had been added the second part of the NaOH (NaOH-II) was added. After the addition of NaOH-II, the composition was cooked at 75° C. until the viscosity of the composition was 100 cP. Then the LMW-lignin, i.e. lignin having an average molecular weight of 350 g/mol, was added to the composition. The cooking was continued at the temperature of 75° C. until the viscosity of the formed composition was about 305 cP. Then the composition was cooled resulting in a final viscosity of 350 cP. The viscosity was measured at a temperature of 25° C.

The procedure of example 3 results in the possibility of replacing 66% of the synthetic phenol usually used in the binder production method with lignin.

Example 4—Preparing a Binder Composition

In this example a binder composition was produced. The following components and their amounts were used:

|  | concentration | amount (g) |
| --- | --- | --- |
| water |  | 137 |
| NaOH-I | 50% | 116 |
| HMW-lignin | 70% | 91.4 |
| LMW-lignin | 90% | 285 |
| phenol | 90% | 89 |
| formaldehyde | 40% | 342 |
| NaOH-II | 50% | 58 |

Firstly, water, the first part of NaOH (NaOH-I) and HMW-lignin, i.e. lignin having an average molecular weight of 10000 g/mol, were mixed such that a dispersion was formed. Simultaneously the temperature increased from room temperature to about 60° C. Then the LMW-lignin, i.e. lignin having an average molecular weight of 1900 g/mol, was added to the dispersion while keeping the temperature at 25-50° C.

Then all of the phenol was added followed by adding the formaldehyde in a stepwise manner for forming an aqueous composition. The temperature was kept under 75° C. After adding the formaldehyde the composition was allowed to react for 10 minutes after which also the second part of the NaOH (NaOH-II) to the composition. Then the composition was cooked at 70-80° C. until the viscosity of the formed composition was about 375 cp. Then the composition was cooled and the final viscosity was 390 cP. The viscosity was measured at a temperature of 25° C.

In this example firstly a dispersion of water, NaOH and both lignin fractions were formed after which the addition of phenol was started. However, the dispersion could also have been subjected to alkalation treatment in accordance with the procedure presented in example 1 in order to make the lignin used even more reactive.

The procedure of example 4 results in the possibility of replacing 80% of the synthetic phenol usually used in the binder production method with lignin.

Example 5—Preparing an Adhesive Composition

In this example the binder composition produced in Example 1 was used for the production of an adhesive composition. The binder composition was mixed with extenders, fillers, catalysts, additives, as examples of which e.g. starch, wood flour and hardener (e.g. tannin or carbonates) can be mentioned, thus forming the adhesive composition.

Example 6—Applying the Binder Composition for Producing a Plywood Product

Wood veneers having the thickness of below 3 mm were glued together with the binder composition produced in Example 2 for producing a 7-plywood. Results showed that the gluing effect was sufficiently good for gluing wood veneers.

Example 7—Applying the Adhesive Composition for Producing a Plywood Product

In this example the adhesive composition of Example 5 was applied onto wood veneers. The wood veneers were joined together by the adhesive composition for forming a plywood. The dry matter content of the adhesive composition was between 45 and 55%. The wood veneers with the adhesive composition were pressed by hot-pressing technique at a temperature between 120-170° C. The adhesive composition was simultaneously cured. The adhesive composition of the present invention was found suitable for gluing wood veneers together and thus for manufacturing plywood.

Example 8—Applying the Binder Composition for Producing Laminates

In this example the binder composition as produced in Example 3 was used in an impregnation application. During the production of laminates paper was impregnated with an alcohol solution of the binder composition, after which the impregnated layers were transferred into a furnace. The alcohol was volatilized and the binder composition was partly cured. The layers comprising such semi-cured composition were arranged the one above the other and baked by a hot-pressing technique in order to form uniform thicker boards or laminates.

In the binder production method presented in the examples above, phenol and formaldehyde are used are used as examples of polymerizable substance and crosslinking agent, respectively. However, any other polymerizable substance or crosslinking agent disclosed in this specification can be equally well used in the binder composition production method as will be obvious for the skilled person based on this specification.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A binder composition comprising a result of:
    (i) forming an aqueous composition comprising reactant components including lignin molecules of 11-60 lignin units, lignin molecules of 1-10 lignin units, polymerizable substance, and crosslinking agent in the presence of a catalyst, wherein the weight ratio of the lignin molecules of 11-60 lignin units to the lignin molecules of 1-10 lignin units is 0.1-20; and
    (ii) cooking the aqueous composition at a temperature of 45-95° C. for polymerizing the reactant components until a binder composition with a predetermined viscosity value is formed.

2. An adhesive composition comprising a binder composition formed as a result of:
    (i) forming an aqueous composition comprising reactant components including lignin molecules of 11-60 lignin units, lignin molecules of 1-10 lignin units, polymerizable substance, and crosslinking agent in the presence of a catalyst, wherein the weight ratio of the lignin molecules of 11-60 lignin units to the lignin molecules of 1-10 lignin units is 0.1-20; and
    (ii) cooking the aqueous composition at a temperature of 45-95° C. for polymerizing the reactant components until a binder composition with a predetermined viscosity value is formed.

3. A method of forming a strengthened plastic, a compressed casting, a laminate, or a lacquer comprising applying a binder composition by impregnation application or coating, the binder composition comprising a result of:
    (i) forming an aqueous composition comprising reactant components including lignin molecules of 11-60 lignin units, lignin molecules of 1-10 lignin units, polymerizable substance, and crosslinking agent in the presence of a catalyst, wherein the weight ratio of the lignin molecules of 11-60 lignin units to the lignin molecules of 1-10 lignin units is 0.1-20; and
    (ii) cooking the aqueous composition at a temperature of 45-95° C. for polymerizing the reactant components until a binder composition with a predetermined viscosity value is formed.

4. A method of gluing a wood product comprising applying an adhesive composition to a wood veneer, the adhesive composition comprising a binder composition resulting from:
    (i) forming an aqueous composition comprising reactant components including lignin molecules of 11-60 lignin units, lignin molecules of 1-10 lignin units, polymerizable substance, and crosslinking agent in the presence of a catalyst, wherein the weight ratio of the lignin molecules of 11-60 lignin units to the lignin molecules of 1-10 lignin units is 0.1-20; and
    (ii) cooking the aqueous composition at a temperature of 45-95° C. for polymerizing the reactant components until a binder composition with a predetermined viscosity value is formed.

5. The binder composition of claim 1, wherein the weight ratio of lignin molecules of 11-60 lignin units to lignin molecules of 1-10 lignin units is preferably 0.2-10, and more preferably 0.5-5.

6. The binder composition of claim 1, wherein step (i) of forming the aqueous composition comprises the following steps:
    (ia) forming a dispersion comprising lignin molecules of 11-60 lignin units; and
    (ib) combining polymerizable substance and crosslinking agent with the dispersion for forming the aqueous composition.

7. The binder composition of claim 6, wherein step (ib) comprises adding catalyst.

8. The binder composition of claim 6, wherein step (i) of forming the aqueous composition comprises, after step (ib), the following steps:
    (ic) cooking the formed composition until the composition has a viscosity, which corresponds to 15-70% of a predetermined viscosity value of the final binder composition; and
    (id) adding lignin molecules of 1-10 lignin units as a reactant component to the composition.

9. The binder composition of claim 6, wherein step (ia) and/or step (ib) comprises adding lignin molecules of 1-10 lignin units as a reactant component.

10. The binder composition of claim 1, wherein step (i) comprises keeping the composition at a temperature of at most 75° C.

11. The binder composition of claim 8, wherein step (ic) comprises keeping the temperature of the composition between 45-95° C.

12. The binder composition of claim 8, wherein the temperature of the composition is decreased below 85° C. before step (id).

13. The binder composition of claim 1, wherein step (ii) comprises cooking the composition preferably at a temperature of 50-85° C.

14. The binder composition of claim 8, wherein the temperature of the composition is increased up to 45-95° C. before, during or after step (id).

15. The binder composition of claim 1, wherein the weight ratio of lignin molecules of 11-60 lignin units and lignin molecules of 1-10 lignin units to the polymerizable substance is at least 0.2.

16. The binder composition of claim 1, wherein the crosslinking agent is an aldehyde, and preferably formaldehyde.

17. The binder composition of claim 1, wherein the polymerizable substance is selected from a group consisting of phenol, cresol, resorcinol and combinations thereof.

18. The binder composition of claim 1, wherein the catalyst is sodium hydroxide.

\* \* \* \* \*